United States Patent [19]

Swanson

[11] 4,069,971
[45] Jan. 24, 1978

[54] SOLAR AIR CONDITIONING SYSTEM

[76] Inventor: David A. Swanson, 1217 W. 4th St., Tempe, Ariz. 85281

[21] Appl. No.: 630,292

[22] Filed: Nov. 10, 1975

[51] Int. Cl.² .............................................. F24J 3/02
[52] U.S. Cl. .................................. 237/1 A; 126/400; 165/18
[58] Field of Search .............. 237/1 A; 126/270, 271, 126/400; 165/31, 56, 18

[56] References Cited

U.S. PATENT DOCUMENTS

| | | | |
|---|---|---|---|
| 3,902,474 | 9/1975 | Pyle | 237/1 A |
| 3,908,751 | 9/1975 | Sheppard, Jr. | 165/31 |
| 3,996,919 | 12/1976 | Hepp | 126/270 |

Primary Examiner—William E. Wayner
Attorney, Agent, or Firm—Gregory J. Nelson

[57] ABSTRACT

A building structure is provided with a conventional air conditioning unit and a solar energized air heater unit. Heated air is drawn from the solar unit and discharged into the structure in response to a thermostat. Means are provided for supplying heated air from the air conditioning unit when the supply from the solar unit is inadequate to maintain a predetermined minimum temperature. Radioscope means disconnect the solar unit from the system when available solar energy falls below a predetermined value. The structure may include a wall having air storage capacity therein for receiving and holding heated air from the solar unit, which air is subsequently delivered to the interior of the structure.

2 Claims, 11 Drawing Figures

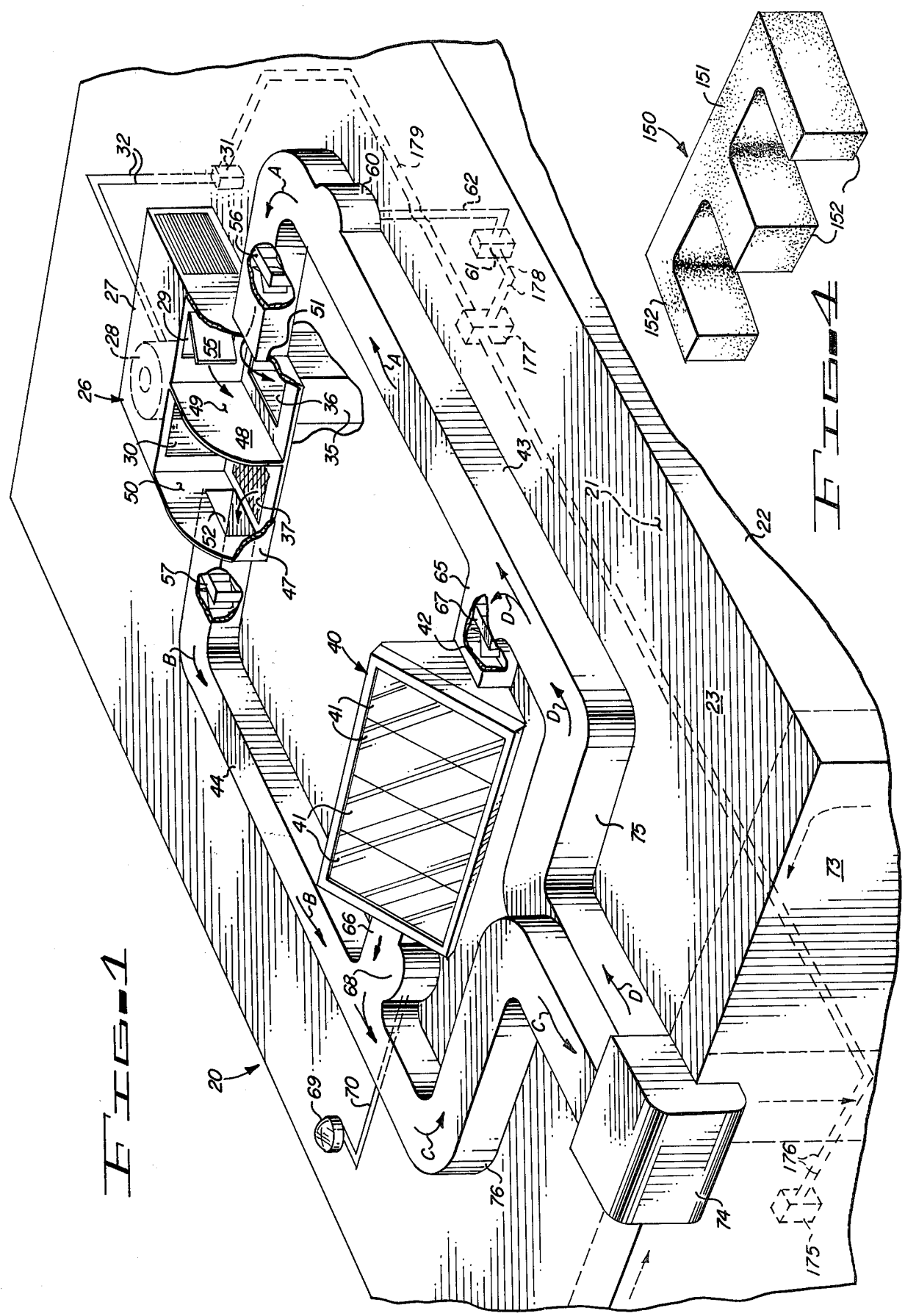

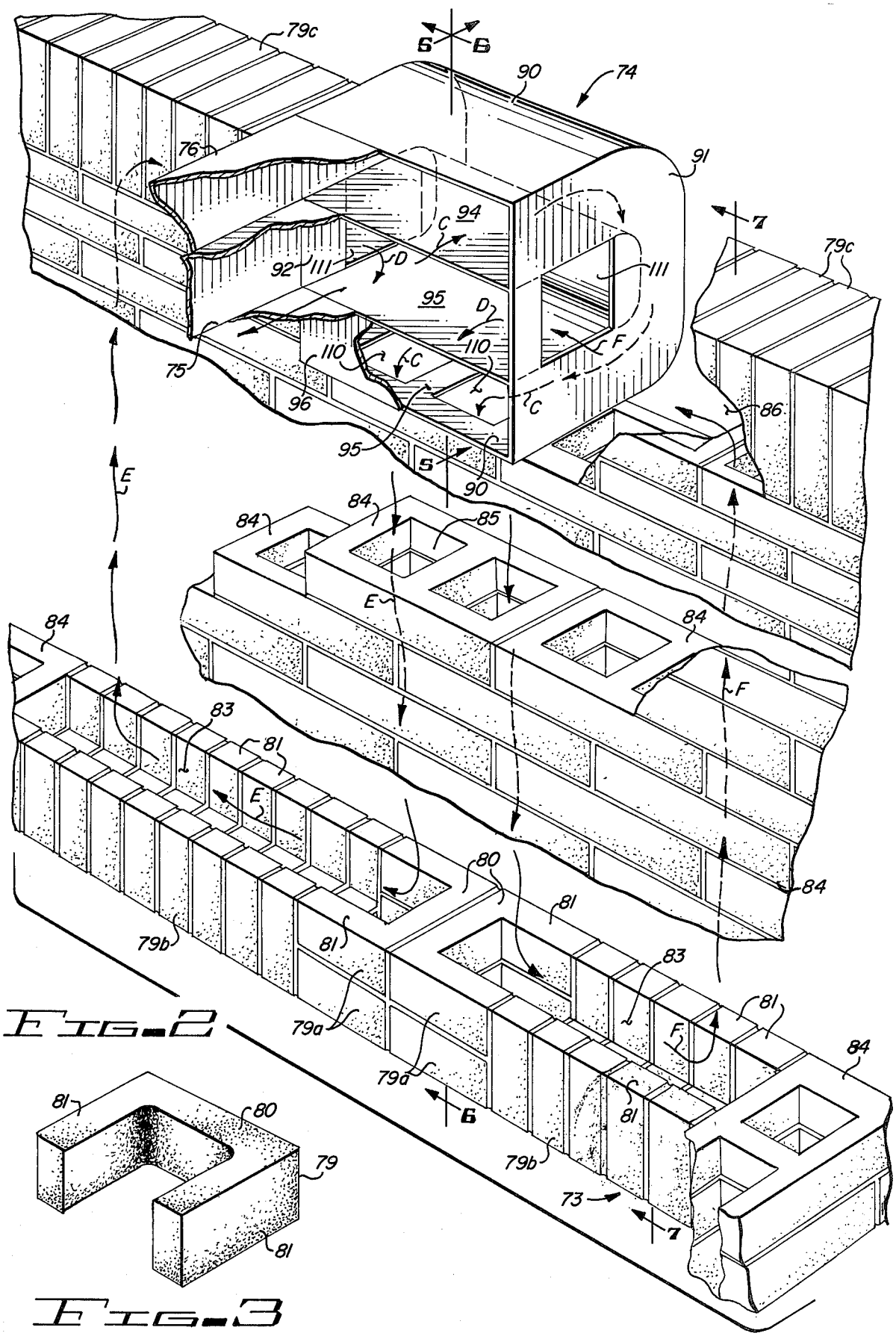

SOLAR AIR CONDITIONING SYSTEM

This application contains subject matter referred to in a Document Disclosure #038780, filed in the Patent Office on Feb. 20, 1975.

This invention relates to air conditioning systems for building structures.

More particularly, the present invention concerns an air conditioning system utilizing conventional and solar units for maintaining a predetermined temperature within a structure.

The prior art is replete with various solar energized devices for heating houses and other dwellings. While operating effectively during periods of adequate solar radiation such devices have generally proven unreliable as a primary or single source of heating. To improve upon solar heaters and extend the serviceability thereof, various heat storage schemes have been proposed. One of the more common heat storage plans utilizes solar energy to heat water or other liquid which is then stored for subsequent use during periods of reduced solar radiation.

In recognition of the limits of solar units, the prior art has provided supplemental heating by conventional means. The combination systems, however, are exceedingly complex and have not achieved universal recognition. Major inhibiting factors have been the involved control systems, space requirements and the inefficiency of the heat storage facilities. Further, such systems generally require that the structure including specific accommodations be customly constructed for the purpose or alternately require extensive modifications to the preexisting structure.

Since the advantages of solar heating systems are well established it would be highly advantageous to provide an air conditioning system utilizing solar energy.

Accordingly, a principal object of the present invention is the provision of an air conditioning system utilizing solar and conventional heating elements.

Another object of the present invention is to provide a combination air conditioning system incorporating forced air and radiant heating means.

Still another object of the invention is to provide a solar heating facility for use in connection with conventional heating facilities.

Yet another object of the invention is the provision of a combination solar and conventional air conditioning system having simplified controls and heat conduction means.

Yet still another object of the instant invention is to provide a combination air conditioning system which can be readily installed into preexisting structures.

A further object of the invention is the provision of a heating system having unique heat storage facilities.

Yet a further object of the present invention is to provide a solar heating unit which can be integrated with preexisting heating and cooling systems including the conventional air conditioning unit and air ducting.

And, a further object of the instant invention is the provision of an air conditioning system of the above type which is relatively inexpensive to manufacture, install and maintain.

Briefly, to achieve the desired objectives of the present invention in accordance with a preferred embodiment thereof, first provided is an enclosed structure having a conventional air conditioning unit including a blower or other air mover means. Treated air is discharged from the air conditioning unit into primary air duct means which delivers the air to predetermined points within the structure. Expended air is recirculated to the air conditioning unit through conventional air return means. The air conditioning unit is operatively responsive to a primary thermostat within the structure.

Next provided is a solar unit for receiving solar radiation and heating air passed therethrough. Secondary duct means deliver heated air from the solar unit to primary duct and provide for return of expended air to the solar unit. Heated air from the solar unit is forced through the primary duct means by a secondary air mover responsive to secondary thermostat means within the structure.

The solar unit is operatively disconnected from the system in response to means sensitive to available ambient solar energy. The building structure may also include a wall having air passage and heat storage capacity means therein. Tertiary duct means communicate between the storage wall and the solar unit and the secondary duct means. Heat from the heated air held in the storage wall enters the structure through radiation from the wall or as heated air forced through the primary duct means.

The foregoing and further and more specific objects and advantages of the present invention will become readily apparent to those skilled in the art from the following detailed description of the preferred embodiments thereof taken in conjunction with the drawings in which:

FIG. 1 is a perspective view of an air conditioning system constructed in accordance with the teachings of the present invention, having portions thereof broken away for clarity of illustration, as it would appear when installed in combination with a building structure, the structure being shown in partial outline;

FIG. 2 is a broken, partial perspective view of a wall having air flow and heat storage capacity therein in accordance with the present invention and especially adapted to be used in combination with the building structure and air conditioning system of FIG. 1;

FIG. 3 is a perspective view of a construction block for use in fabricating the wall of FIG. 2;

FIG. 4 is a perspective view of an alternate construction block useable in the fabrication of the wall of FIG. 2;

Figure 5:
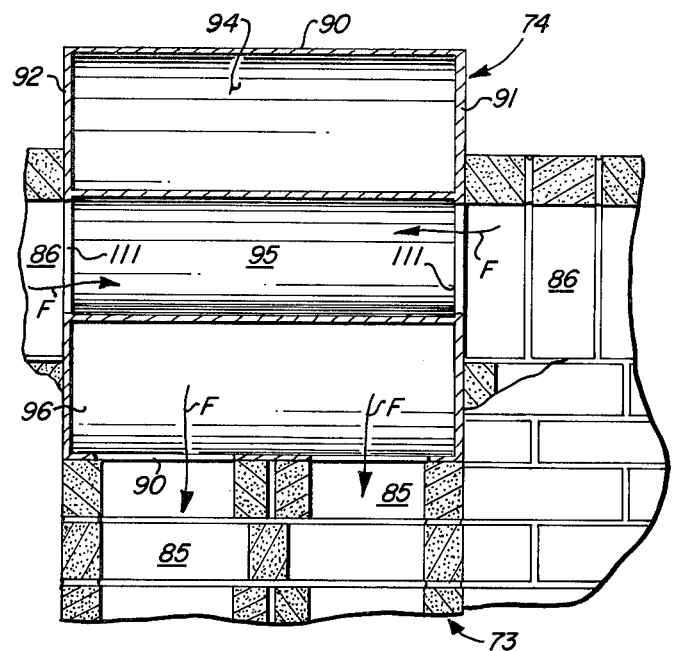
FIG. 5 is a vertical, sectional view taken along the line 5—5 of FIG. 2 and further illustrating a portion of the wall thereof.

Turning now to the drawings in which the same reference numerals indicate corresponding elements throughout the several views, attention is first directed to FIG. 1 which shows an air conditioning system in accordance with the teachings of the present invention operatively installed in a building structure generally designated by the reference character 20 having an interior space 21 therein defined by walls 22 and roof 23. Although not specifically herein shown, it will be appreciated that building structure 20 includes a floor, additional walls and entry door and may include windows and interior partitions and other elements as are well known in the building art. The exact type of structure or specific use thereof is unimportant for the immediate purpose and may include such types as a single unit residence, apartment complex or office building.

A conventional air conditioning unit 26 is mounted upon roof 23. The term air conditioning unit as used herein refers to an apparatus which is capable of performing one or several air treatment operations including freeing the air from dust and regulating the temperature and moisture thereof. Such devices are also referred to in the trade as HVAC (heating, ventilating, air conditioning) units. Such units are commonly mounted upon the roof of the structure adjacent an exterior wall or located within the interior of the building. For purposes of simplicity of illustration the immediate HVAC unit 26 is depicted as a roof mounting type.

Typically, air conditioning unit 26 includes an external sheet metal housing 27 which enclosed primary air mover 28 and the necessary apparatus for providing the specific air treatment. Air mover 28 is generally an electric fan or blower while the air treatment apparatus is usually either electric or gas powered. Discharge port 29 and inlet port 30 extend through housing 27. Treated air is discharged through port 29 while expended air is returned to air conditioning unit 26 through inlet port 30. Primary thermostat 31 is sensitive to the temperature within building structure 20 and energizes air conditioning unit 26 through leads 32 for the discharge of heated air therefrom when the temperature has fallen below a predetermined first minimum value.

The foregoing description of air conditioning unit 26 and primary thermostat 31 is in accordance with conventional practice as will be readily understood by those skilled in the art. Similarly, in accordance with established practice building structure 20 includes primary air distribution means herein represented by primary duct 35. Air discharged from air conditioning unit 26 through port 29 enters through inlet end 36 of duct 35 and is appropriately distributed within interior space 21. For this purpose primary duct 35 is generally provided with one or more outlets for the discharge of air therethrough. Expended air, that is air which has been exhausted from duct 35 and used for heating interior space 21, is recirculated to air conditioning 26 through air return grill 37 and subsequently through inlet port 30.

Solar unit 40 is mounted upon roof 23 and oriented preferably with a southern exposure to receivee radiation through transparent plates 41. Solar unit 40 includes first opening 42 at one end thereof and a second opening not specifically illustrated but located in the end opposite opening 42. Air circulates through solar unit 40 and is heated by solar radiation passing through transparent plates 41. The prior art has provided various solar collector units for receiving solar radiation and utilizing the energy therefrom to raise the temperature of a fluid medium circulated therethrough. Since such devices are well known and the novelty of the immediate invention is not dependent upon the specific solar collector unit further details thereof will not be presented.

A secondary duct arrangement having first leg 43 and second leg 44 communicates between solar unit 40 and interior space 21. Specifically, leg 43 communicates between first opening 42 and inlet 36 of primary duct 35. Second leg 44 communicates between the second opening of solar unit 40 and air return 37.

Air supply and return elbow 47 is divided by partition 48 into supply chamber 49 and return chamber 50. Supply chamber 49 is a common junction for discharge port 29 of air conditioning unit 26, inlet 36 of primary duct 35 and discharge end 51 of first leg 43 of the secondary duct means. Return chamber 50 provides common communication between inlet port 30 of air conditioning unit 26, inlet end 52 of second leg 44 and air return grill 37.

A one-way air flow gate 55 prevents air from secondary duct leg 43 entering air conditioning unit 26 from supply chamber 49. Air flow gate 55 includes a cover which is pivotally secured to discharge port 29. In a preferred embodiment the cover is held in a normally closed position via light spring action and urged open in response to air pressure created by air mover 28. Alternately, the cover is opened electronically, as by a soleniod switch, in response to activation of air mover 28. One-way air flow gates 56 and 57 are also located within first and second legs 43 and 44. Air flow gate 56, located near discharge end 51 of first leg 43, is normally closed and opens to allow discharge of air from first leg 43 in the direction of supply chamber 49. Air flow gate 57 located in second leg 44 is generally simila to air flow gate 56 and provides for air movement in a direction from return chamber 50 into second leg 44. Air flow gates 56 and 57 will be described in greater detail presently.

Secondary air mover 60 in the form of an electric fan or motor is located in first leg 43 and functions to draw air, in a direction indicated by arrows A, towards discharge end 51. Secondary thermostat 61 sensitive to the termperature within interior space 21 is operatively connected to secondary air mover 60 through leads 62. When the temperature within building structure 20 falls below a predetermined second value, secondary thermostat 61 energizes secondary air mover 60. Air is returned through second leg 44 in the direction of arrows B.

Connector element 65 extends between first opening 42 of solar uni art has provided various solar collector units for receiving solar radiation and utilizing the energy therefrom to raise the temperature of a fluid medium circulated therethrough. Since such devices are well known and the novelty of the immediate invention is not dependent upon the specific solar collector unit further details thereof will not be presented.

Wall 73 of building structure 20 has air storage means therein and includes plenum 74 for receiving and discharging air. Wall 73 and plenum 74 will be hereinafter described in detail. Tertiary air duct means circulate air between solar unit 40, secondary air duct means and plenum 47. More specifically first leg 75 of the tertiary air duct means communicates between the discharge port of plenum 74 and first leg 43 of the secondary air duct means and first opening 42 of solar unit 40. Second leg 76 of the tertiary air duct means communicates between the inlet port of plenum 64 and the second opening of solar unit 40. In accordance with this arrangement connector element 65 is considered common to first leg 43 of the secondary air duct means and first leg 75 of the tertiary air duct means. Similarly, second leg 44 of secondary air duct means and second leg 76 of the tertiary air duct means commonly share connector element 66. Air flow through leg 76 is to plenum 74 as indicated by arrow C and air moves through leg 75 in the direction of arrow D from plenum 74 toward solar unit 40.

Referring now to FIG. 2 it is seen that air storage wall 73 has a first course of C-shaped blocks 79. Each C-block 79 includes a base section 80 and spaced legs 81 extending therefrom. The height and width of C-shaped block 79 is consistent with the dimensions of standard building blocks and has a length as determined by the length of leg 81 which is twice the height of a standard building block. In accordance with a preferred manner of construction two pair of C-shaped blocks, designated by the reference characters 79A, are placed horizontally in back-to-back arrangement with base portions 80 abutted at the center line of the wall and legs 81 extending in opposite directions therefrom. The balance of the first course is completed by C-blocks designated 75B which are placed with base 80 downward and legs 81 extending upwardly. At the outboard edges of blocks 79B are standard construction blocks 84 which form the lower two courses of the walls adjacent storage wall 73. The arrangement of C-blocks 79A and C-blocks 79B together with the sides of blocks 84 form air-tight cavities 83 proximate the lower edge of storage wall 73.

Several courses of standard construction blocks 84 are placed upon the lower course in accordance with standard construction procedure. Each block 84 is of the type having an opening 85 therethrough. Wall 73 is capped at the top thereof with a course of C-shaped blocks 79C in juxtaposition with legs 81 extending downwardly, thus providing a cavity 86 along the top of wall 73 generally corresponding to cavity 83.

Figure 6:
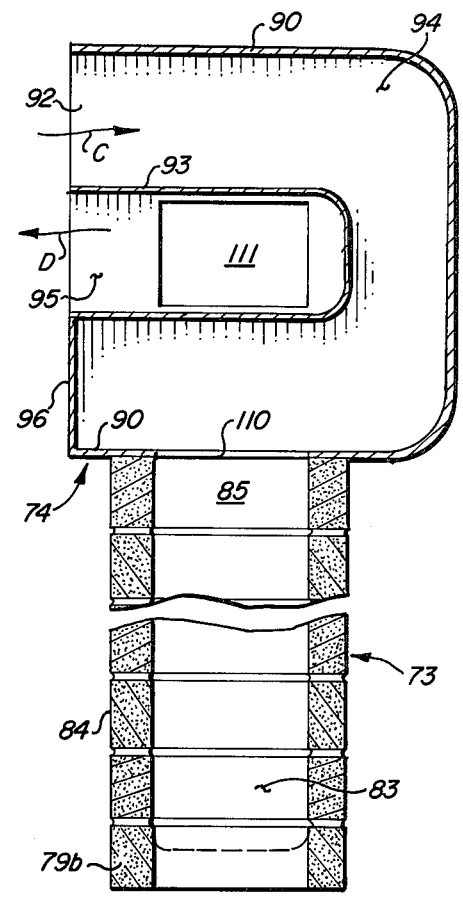
FIG. 6 is a vertical, sectional view of the wall of FIG. 2 and taken along the line 6—6 thereof.

Plenum 74 as is also seen in FIGS. 5 and 6 is installed in wall 73 near the upper edge and in alignment with blocks 79A. Plenum 74 includes C-shaped shell member 90 and end panels 91 and 92. C-shaped baffle member 93 extending between panels 91 and 92 forms first and second air compartments 94 and 95 within plenum 74. An elongate panel 96 extends between end panels 91 and 92 and between the lower edge of baffle 93 and the lower edge of outer shell 90.

Plenum 74 communicates between the tertiary air duct means and storage wall 73. Specifically, first leg 75 opens into second air compartment 95 while second leg 76 communicates with first air chamber 94. Openings 110 in the bottom of outer shell 90 are aligned with respective openings 85 in block 84 which in turn communicate with air-tight cavities 83 on respective sides of C-block 79A. Openings 111 and end panels 91 and 92 are aligned with respective air-tight cavities 86 at the top of storage wall 73.

Figure 7:
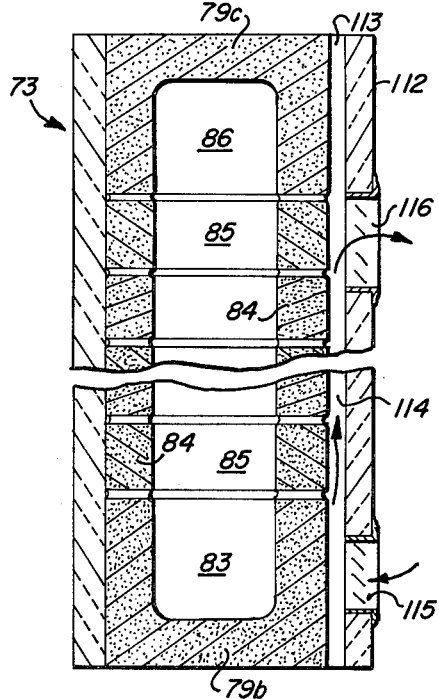
FIG. 7 is another vertical, sectional view of the wall of FIG. 2 taken along the line 7—7 thereof and spaced from the view of FIG. 6.

Storage wall 73 is further illustrated in FIG. 7 which particularly shows the passage between lower air cavity 83 and upper air cavity 86 formed by openings 85 in conventional construction blocks 84. Insulative panelling 112 is affixed in a spaced relationship to the interior side of storage wall 73 by furring strips 113. Furring strips 113 are arranged such that an air flow chamber is created between insulative panel 112 and the surface of storage wall 73. Adjustable louvered grills 115 and 116 extend through insulative panelling 112 proximate the bottom and top thereof, respectively.

The air conditioning system of the instant invention, the elements of which have been described in detail in connection with the foregoing embodiment, has several functional modes. The modes are automatically sequentially operational and in general are arranged to rely upon the least expensive operational modes first. That is, the initial heating is done with the least expensive and the simplest elements. As additional heating is required, additional elements are automatically brought into service.

The functional description of the instant embodiment will proceed assuming that the sun is shining and that the temperature within structure 20 is slightly below that for human comfort and ambient temperature is decreasing. Referring first to FIG. 1 solar radiation is passing through transparent plates 41 and the energy therein is heating air within solar unit 40. Radiometer 69, receiving solar radiation above a predetermined minimum value, energizes tertiary air mover 68. The predetermined minimum value associated with radiometer 69 is that level of solar energy above which solar unit 40 is capable of producing a continuous supply of heated air as it is drawn therethrough by tertiary air mover 68.

One-way air flow gates 56 and 57 are closed prohibiting air circulation in either the primary or secondary duct means. A closed circulation system is thereby formed including solar unit 40, first and second legs 75 and 76, respectively, of tertiary air duct means, plenum 74 and heat storage wall 73. Air drawn from solar unit 40 by tertiary air mover 68 is introduced into second leg 76 of tertiary means for delivery to plenum 74. Air circulation through plenum 74 and storage wall 73 will be described presently. Air discharged from storage wall 73 through plenum 74 returns through first leg 75 of the tertiary duct means to solar unit 40 passing through air flow gate 67 which opens in response to activation of tertiary air mover 68.

Air entering plenum 74 from second leg 76 moves through first air compartment 94 and is discharged through openings 110. The air is then forced downwardly through passages formed by openings 85 in blocks 84 into cavities 83. From cavity 83 the air moves upwardly through several passages formed by openings 85 into cavities 86. Due to the construction of the wall as hereinbefore described two counterrotational air flow paths, as graphically represented by the arrows E and F, are generated within wall 73. Air from cavities 86 enters second air compartment 95 to respective openings 111 for subsequent return through first leg 75 to solar unit 40.

Heated air passing through wall 73 substantially raises the temperature thereof. Wall 73 thus becomes a heat storage medium and a source of radiant heat for interior space 21. The effectiveness of radiating heat from wall 73 to interior 21 is made further effective as seen in FIG. 7. The heat from wall 73 raises the temperature of air in air chamber 114 causing the heat air to rise and escape through grill 116. The rising air draws cooler air in through grill 115 for heating as it passes through chamber 114 and subsequent discharge through grill 116.

As the temperature continues to recede, it falls below a predetermined setting of thermostat 61. In response thereto, secondary air mover 60 is energized and air flow gates 56 and 57 are opened. Heated air is drawn in the direction of arrow A through first leg 43 of the secondary duct means, introduced into primay duct means 35 for circulation to interior space 21, and returned through return grill 37 in the direction of arrow B through second leg 44 of the secondary duct means. During this phase of operation, air introduced into primary duct means 35 carries latent heat stored in wall 73.

Thermostat 61 controls temperature within the building as long as sufficient reserve of solar heat remains in storage wall 73 of the solar system. Thermostat 175 is attached to wall 73 within the building and has a sensor extending into a hole drilled in the wall. Leads 176 connect with relay 177. From relay 177, leads 178 extend to thermostat 61 and leads 179 are connected to thermotat 31. When the temperature in wall 73 drops below a predetermined setting, thermostat 175 will activate relay 177 to switch heat control from thermostat 61 to thermostat 31 and air conditioning unit 27 will maintain heat within the building by supplementing air discharged from leg 43 and radiant heat from wall 73. When a sufficient supply of solar heat has been restored to the wall by solar radiation, thermostat 175 and relay 177 will switch heat control back to secondary thermostat 61. Thermostat 175 may be of the contact type, having a heat transfer plate in contact with the wall.

Various modifications of the foregoing system are immediately apparent. For example, in preexisting structures without heat storage wall capacity the tertiary air duct means is eliminated and the system would include air conditioning 26, solar unit 40, and the secondary duct system. Obviously in this arrangement the direction of air flow through solar reflector 40 is reversed and only one air mover is required for drawing air through the solar energy unit 40.

Figure 8:
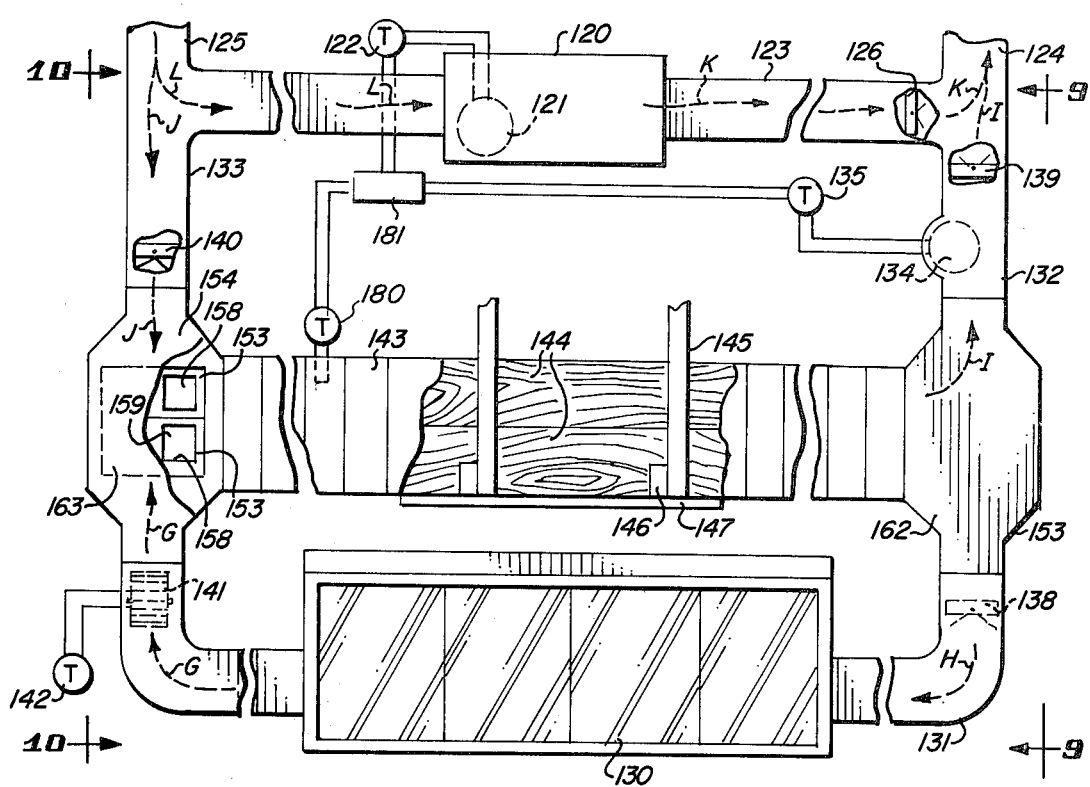
FIG. 8 is a semi-schematic plan view of an alternate embodiment of the air conditioning system of the present invention as it would appear when installed in an alternate building structure, pertinent elements of the building structure being shown in broken fragementary view.
Figures 9, 10:
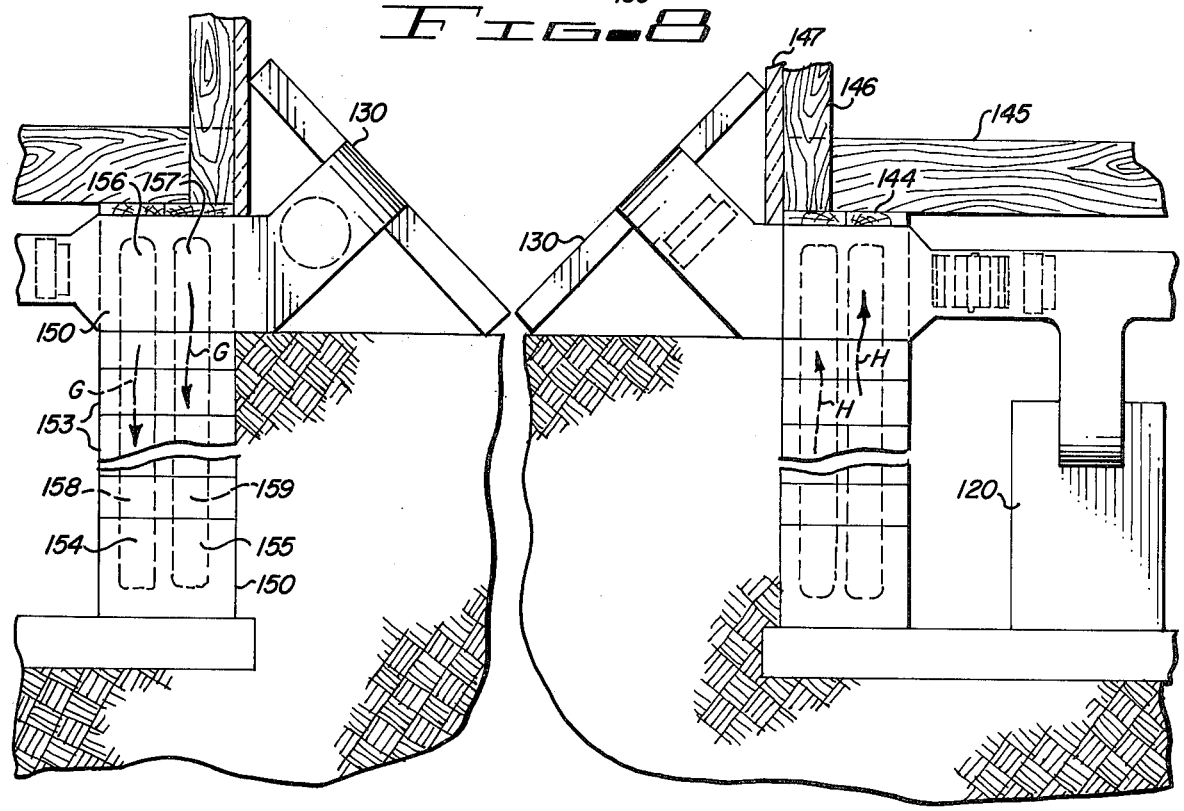
FIG. 9 is a vertical, sectional view taken along the line 9—9 of FIG. 8 and further detailing a portion of the air conditioning system and building structure thereof.
FIG. 10 is a vertical, sectional view taken along the line 10—10 of FIG. 8 and further illustrating a portion of the air conditioning system and building structure thereof.

FIGS. 8, 9 and 10 illustrate an alternately preferred embodiment of the air conditioning system of the instant invention especially adapted for use in a building structure having a full basement, warm air furnace and wood frame construction. Essentially similar to the embodiment hereinbefore described in detail the instant embodiment includes warm air furnace 120, primary air mover 121 and primary thermostat 122. Heated air from furnace 120 is delivered to the interior of the structure through primary duct means 123 having air delivery leg 124 and air return leg 125. Air flow gate 126 is located in delivery leg 124 and is functionally equivalent to one-way air flow gate 55.

Secondary duct means 131 has a first leg 132 which extedns between solar unit 130 and primary outlet duct 124, and a second leg 133 receiving expended air from primary return duct 125. Secondary air mover 134 responsive to secondary thermostat 135 is located in first leg 132 of secondary duct means 131. Air flow gates 138 and 139 in first leg 132 of secondary duct means 138 are the equivalent of air flow gates 67 and 56 as hereinbefore described. Air flow gate 140 in second leg 133 is analogous to previously described air flow gate 57. Tertiary air mover 141 is also located in second leg 133 and is responsive to radiometer 142.

Basement wall 143 is an air circulation and heat storage wall generally similar to previously described wall 73. In convential fashion, wall 143 supports sill plates 144, joists 145, and wall studs 146 to which exterior siding 147 is attached. Due to the additional weight carried by the basement wall 143, the top and bottom courses are constructed of E-blocks 150 as is better illustrated in FIG. 4. E-block 150 includes base 151 and three spaced parallel legs 152 extending therefrom. Base 151 of E-block 150 is approximately twice the length of base 79 of C-block 80 and provides a substantially stronger wall, as is generally common in the construction of basements. As is better seen in FIGS. 9 and 10, specifically, the top and bottom courses of the wall 143 are E-blocks 150 with courses of standard blocks 153 therebetween. In accordance therewith, wall 143 is provided with two air-tight cavities 154 and 155 along the bottom thereof, two air-tight cavities 156 and 157 along the top thereof, and a plurality of passages 158 and 159 through openings in blocks 153. The system of air-tight cavities and passages is basically similar to that described previously in connection with wall 73 except that two separate systems of such passages are provided side-by-side. This arrangement also provides additional insulation of the wall.

Adaptors 162 and 163 are placed in first and second legs 132 and 133, respectively, of secondary duct system 131. Adaptor 163 has an opening in the bottom thereof which communicates with passages 158 and 159 in blocks 153. In accordance with a preferred embodiment, adaptors 162 and 163 have essentially the same height as the top course of E-block 150. Adaptor 162 has an opening in the side thereof which communicates with air cavities 156 and 157.

Operation of the immediate basement type air conditioning system is similar to the roof-mounted air conditioning system hereinbefore described. Initially, when sufficient solar radiation is available as determined by radiometer 142, tertiary air mover 141 draws air in the direction of arrow G through solar unit 130. The heated air moves through second leg 133 of secondary duct means 131 to adaptor 163. Gate 140 is closed and the air is forced to inner passages 158 and 159 in wall 143. The air is forced downwardly to cavities 154 and 155 rising up through various pssages 158 and 159 into air cavities 156 and 157. Radiant heat therefrom rises upwardly into the building structure formed by joists and studs 145 and 146, respectively. As the heated air moves through wall 143, the heat therein is lost to the wall with the cooler air finally arriving in cavities 154 and 155 adjacent adaptor 162. The cooler air is drawn up through the final passages 158 and 159 of wall 143 into adaptor 162 and returns in the direction of arrow H through flow gate 138 to solar unit 130.

As additional heating is needed within the structure, as determined by thermostat 135, secondary air mover 134 is energized drawing a portion of the previously described air from adapter 162 and urging the air through gate 139 into delivery leg 124 of primary duct system 132 as indicated by arrow I. At this time, gate 126 is closed. The air is recirculated through return leg 125 in the direction of arrow J, and gate 140 to adaptor 163 for recirculation. A further drop in temperature as determined by thermostat 122 energizes hot air furnace 120 and primary air mover 121. Supplemental hot air from hot air furnace 120 moves through air flow gate 126 into delivery duct 124, as noted by arrow K and returns as illustrated by arrow L. Depending upon the supply of solar heat remaining in wall 143, control of building temperature regulated by thermostats 122 and 135 by means of wall thermostat 181 and relay 181.

Figure 11:
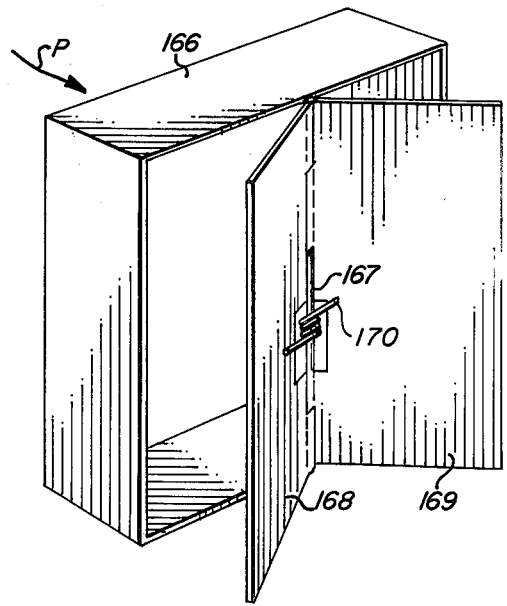
FIG. 11 is a perspective view of a preferred embodiment of an air flow gate useable in connection with the air conditioning system of the instant invention.

While the various air flow gates used in the embodiments of the instant invention may be of any particular configuration and operated automatically, mechanically or electrically, a preferred embodiment of an air gate is seen in FIG. 11. The air gate includes frame 166 which is sized and shaped to be closely received within the air duct. A pin 167 extends vertically between opposite sides of frame 166 proximate the center thereof. Free swinging doors 168 and 169 are pivotally carried by pin 167. The doors 168 and 169 are sized to freely move within the air duct. As air moves through the duct in the direction of the arrow P in response to an air mover, doors 168 and 169 pivot about pin 167 to open for the passage of air through frame 166. Movement of air in a direction opposite arrow P forces the doors against frame 166 and prevents the movement of air therethrough. Although not specifically herein illustrated, stop means such as a tab extending from frame 166 may limit the opening of doors 168 and 169. Alternately, a light spring 170 such as a torsion spring would about pin 167 can be employed to oppose the opening movement and insure that the doors close during periods of non-use. The air flow gate is sized and shaped to be closely received within the duct means and the exact geometric configuration thereof, i.e., rectangular, circular, etc., is determined by the configuration of the specific duct.

Various changes and modifications in the devices herein chosen for purposes of illustration will readily occur to those skilled in the art. For example, the primary and secondary thermostat means can be incorporated into a single two position thermostat. It is noted that the secondary air mover may be deactivated in response to the temperature falling to the second predetermined value. Similarly, a thermostat can be placed in series with the radiometer for initial start-up of the system. Further, it is understood that the term radiometer is a generic term for any device even including a thermostat which will detect the heat or radiant energy available to the solar unit. It will also be apparent to those skilled in the art that various portions of the system may be utilized or deleted in accordance with the particular objectives to be obtained and the type of building structure intended for use with the air conditioning system. The particular configuration of the air conditioning system will, of course, be adapted to the building structure. Similarly, it is understood that when the solar heating capability is discontinued as in the summer months and the appropriate air gates are closed, cool air may be circulated through the primary duct system in accordance with standard procedure.

It will also be apparent to those skilled in the art that if a basement wall is used for heat storage during the winter, it cn also be used as a cooling medium during the summer months when walls below grade remain substantially cooler than outdoor air. Thermostat settings would then be reversed from those used during the winter. The secondary thermostat would have a lower setting so that upon reaching a certain rise in house temperature the secondary system would circulate cool air from the basement wall. With a further rise in temperature the primary system would be energized for cooling. In localities where it is not practical to construct basements the building site can be graded so that the south wall is partially below grade. Earth fill is then banked against the remainder of the wall as a very effective insulation.

Having fully described and disclosed the present invention and the preferred embodiments thereof in such clear and concise terms as to enable those skilled in the art to understand and practice the same, the invention claimed is:

1. An air conditioning system utilizing solar and conventional energy for use in combination with a building structure having an interior space defined by walls and roof, said system comprising:
   a. an air conditioning unit for providing temperature regulated air;
   b. primary air duct means for receiving air from said air conditioning unit and for discharging air into said interior space;
   c. air return means communicating between said interior space and said air conditioning unit;
   d. a solar collector for elevating the temperature of air therein;
   e. secondary duct means for the circulation of air between said solar collector and said primary duct means;
   f. air mover means for the movement of air through said primary duct means and through said secondary air duct means;
   g. thermostat means connected with said air conditioning unit and with said solar unit whereby said solar heated air is first used to raise the temperature in said space and said air conditioning unit heated air is supplementally used when the required heated air exceeds the capacity of said solar unit;
   h. air flow and storage means integral with one of said walls and including air inlet and outlet passages associated therewith;
   i. tertiary air duct means for the circulation of air between said solar collector and said storage wall;
   j. tertiary air mover means drawing air from said solar collector and directing said air through said tertiary duct means in the direction of the inlet passage of said storage wall;
   k. means responsive to the solar energy available to said solar collector for disengaging said tertiary air mover when said solar energy falls below a predetermined value; and
   l. a normally closed air flow gate in said tertiary air duct means and opening in response to activation of said tertiary air mover.

2. The air conditioning system of claim 1, wherein said air conditioning unit further includes:
   a. an air discharge port for passage of temperature regulated air from said air conditioning unit; and
   b. a normally closed one-way air flow gate associated with said air discharge port opening in response to activation of said air conditioning unit.

* * * * *